Feb. 9, 1960 — D. H. LANCTOT ET AL — 2,924,824
ROTATABLE ANTENNA WITH STABLE PLANE
Filed Nov. 9, 1954 — 6 Sheets-Sheet 2

INVENTORS
DONALD H. LANCTOT &
ALLEN P. ALGEIR
BY J. C. Whittaker
ATTORNEY

INVENTORS
DONALD H. LANCTOT &
ALLEN P. ALGEIR
BY J. L. Whittaker
ATTORNEY

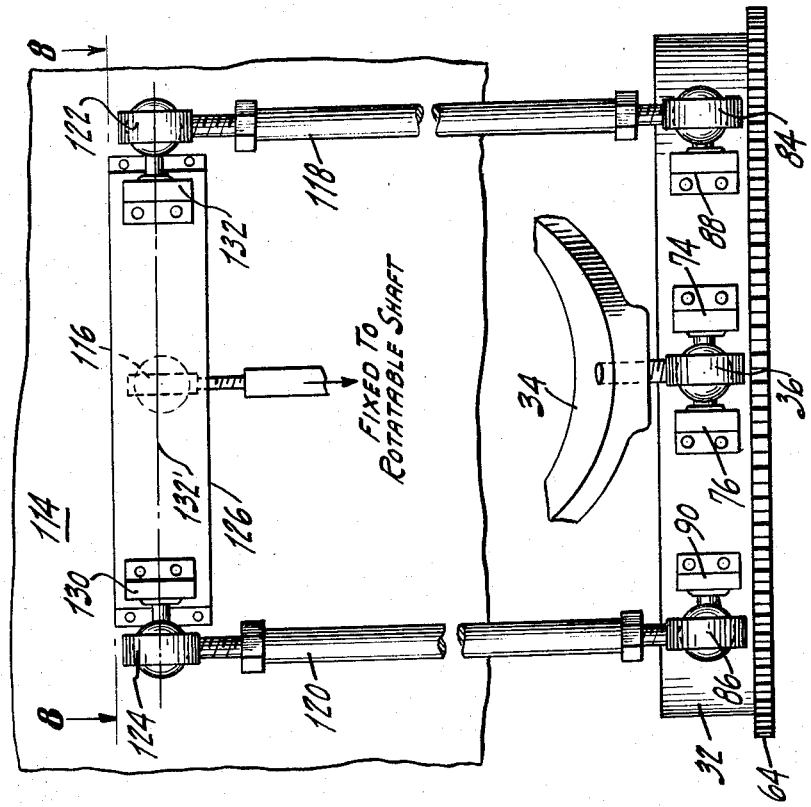
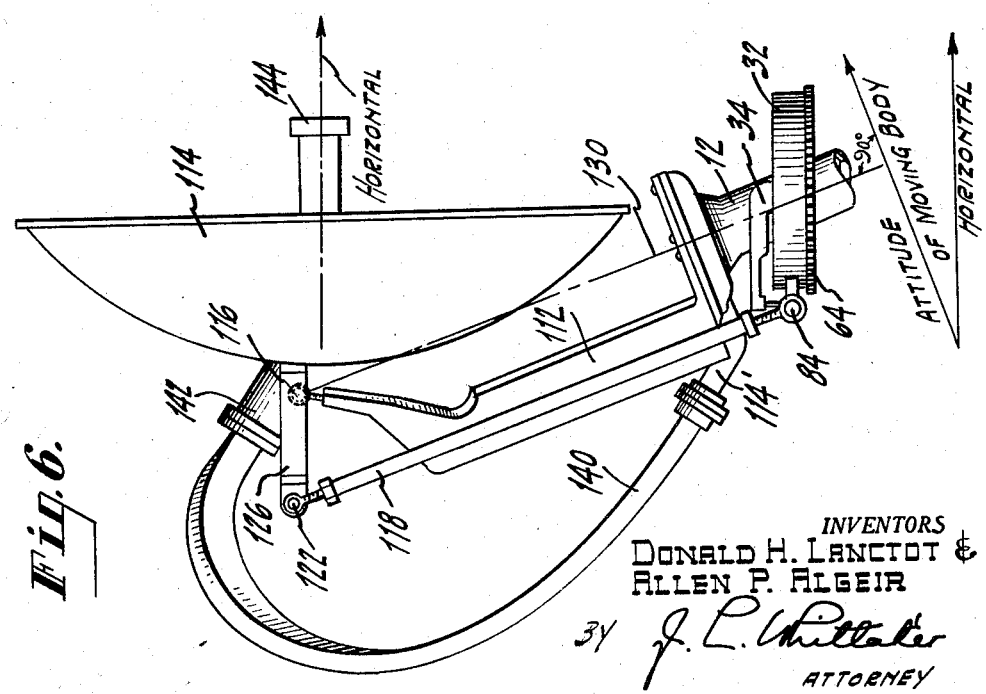

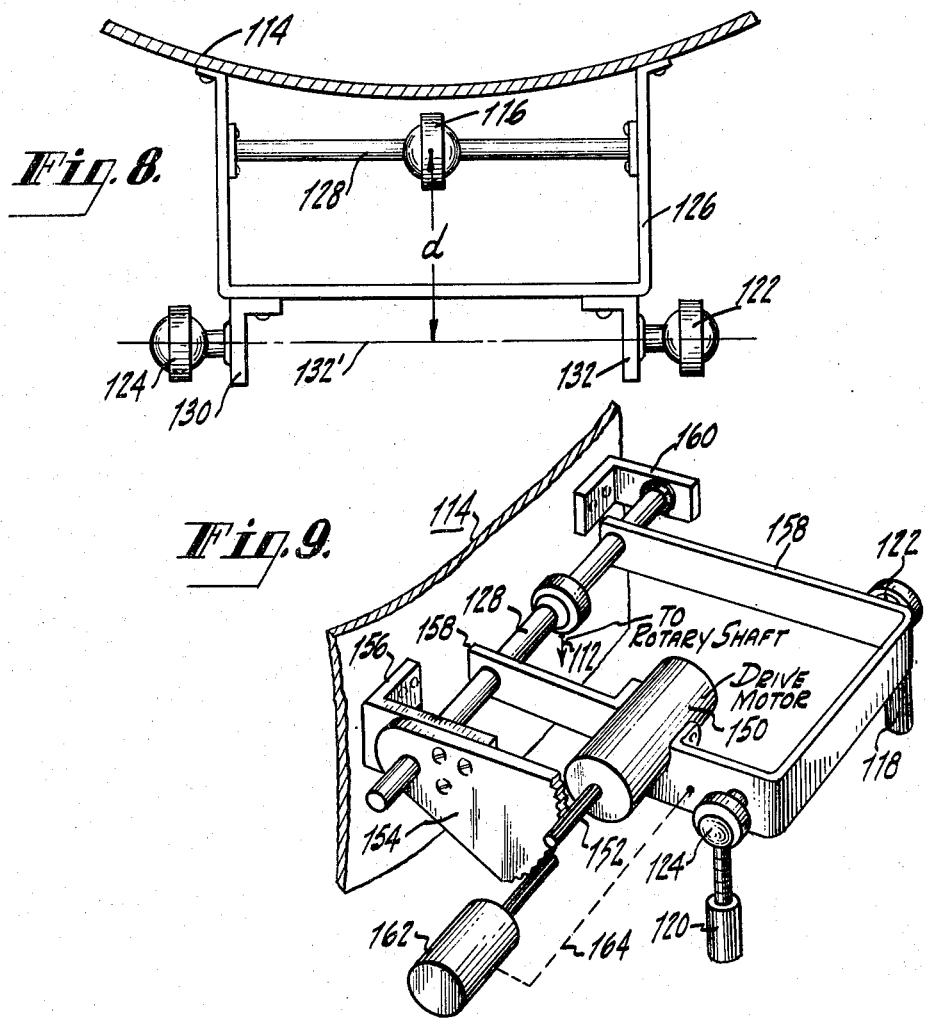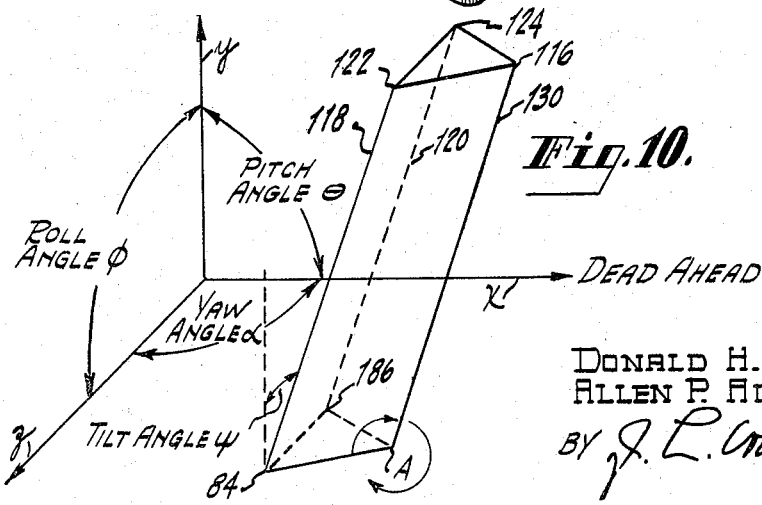

INVENTORS
DONALD H. LANCTOT &
ALLEN P. ALGEIR
ATTORNEY

United States Patent Office 2,924,824
Patented Feb. 9, 1960

2,924,824

ROTATABLE ANTENNA WITH STABLE PLANE

Donald H. Lanctot, Pacific Palisades, and Allen P. Algeir, Los Angeles, Calif., assignors, by mesne assignments, to the United States of America as represented by the Secretary of the Air Force Application November 9, 1954, Serial No. 467,714

21 Claims. (Cl. 343—765)

This invention relates to an improved apparatus for maintaining an object at a desired attitude with respect to a reference plane and is particularly applicable to maintaining an object such as a rotating antenna on a moving body such as an aircraft, land vehicle or ship in a stable position when the body is rolling or pitching. The invention is useful in connection with radar equipment, astronomical instrument stabilization equipment, navigation and survey apparatus, geology instrumentation, radio tracking equipment, gun firing and range finding equipment and other similar equipments.

It is an object of the present invention to provide an improved arrangement for maintaining an object in a predetermined attitude in respect to the reference plane.

It is a further object of the present invention to provide an improved arrangement for maintaining a platform in a stable plane.

It is another object of the present invention to provide an improved mounting for a rotatable element to maintain the latter in a stable plane of rotation regardless of the conditions of roll or pitch.

It is yet another object of the present invention to provide a stable rotating element which presents true azimuthal information regardless of the roll or pitch of its supporting member.

A further object of the present invention is to provide an improved scanning antenna which requires only a single stable vertical gyroscope and one pair of motors to maintain it in stable condition.

Another object of the present invention is to provide a stable rotating antenna system wherein all centers of rotation either intersect or lie on a single line so that errors in angle are reduced to a minimum.

In one form of the invention supporting means are mounted on a moving body such as the deck of a ship, and an inner gimbal is mounted for rotatable movement about an axis with respect to the supporting means. An outer gimbal is mounted for rotatable movement about a second axis perpendicular to the first axis. The element it is desired to maintain in a predetermined angular attitude is secured to the outer gimbal. A gyroscope is mounted to the outer gimbal for deriving pitch and roll error signals in response to departures in pitch and roll of the outer gimbal from its rest position having a polarity dependent upon the sense of said departures in pitch and roll. Means responsive to the error signals, such as a pitch motor and roll motor, rotate the inner and outer gimbals about their respective axes in the correct sense to maintain the outer gimbal and the element mounted thereon in a stable attitude.

In another form of the invention, the gyroscope may be fixedly mounted on the moving body as part of a so-called "null-seeking" positioning servo system. The roll and pitch outputs of the gyroscope drive the pitch and roll motors in the proper sense to maintain the outer gimbal in a stable attitude and when the latter is in its stable attitude the output of the servo system is reduced to zero.

The invention is especially adapted for stabilizing a rotating antenna. In this embodiment of the invention, the supporting means for the stable platform is a hollow shaft or pilaster. Mounted coaxially, partially within the hollow shaft is a rotatable antenna driving and supporting means which is secured at the free end thereof to the rotatable antenna by means of a universal joint. Mounted coaxially with the outer gimbal as, for example, by means of ball bearings is a stable, rotatable annular member. This member is mechanically connected to the rotatable antenna driving and supporting means and rotates therewith. However, it remains in a stable horizontal attitude regardless of the pitch and roll of the hollow shaft. In order to maintain the rotatable antenna in a stable condition while rotating, a pair of parallel rods are secured between the rotatable annular member and the antenna. The rods are secured to the annular member and antenna respectively by means of universal joints. Any pitch or roll of the pilaster causes like movement of the antennna driving and supporting means. However, the pair of rods, also connected to the antenna, compensate for such movement and maintain the antenna in a stable attitude.

In a preferred form of the invention, the rotatable driving means is hollow and forms a circular waveguide for the electromagnetic energy radiated from and received by the antenna.

The invention will be described in greater detail by reference to the following discussion taken in connection with the accompanying drawing in which:

Fig. 6 is a perspective view of a stable, rotatable antenna arrangement according to the present invention;

Fig. 7 is a more detailed view of certain of the elements shown in Fig. 6;

Fig. 8 is a cross-sectional view along line 8—8 of Fig. 7;

Fig. 9 is a perspective view of a form of mechanical coupling between an antenna and its supports;

Fig. 10 is a diagram to illustrate the theory of operation of the present invention;

Throughout the figures, similar reference characters refer to similar elements.

Figure 1:
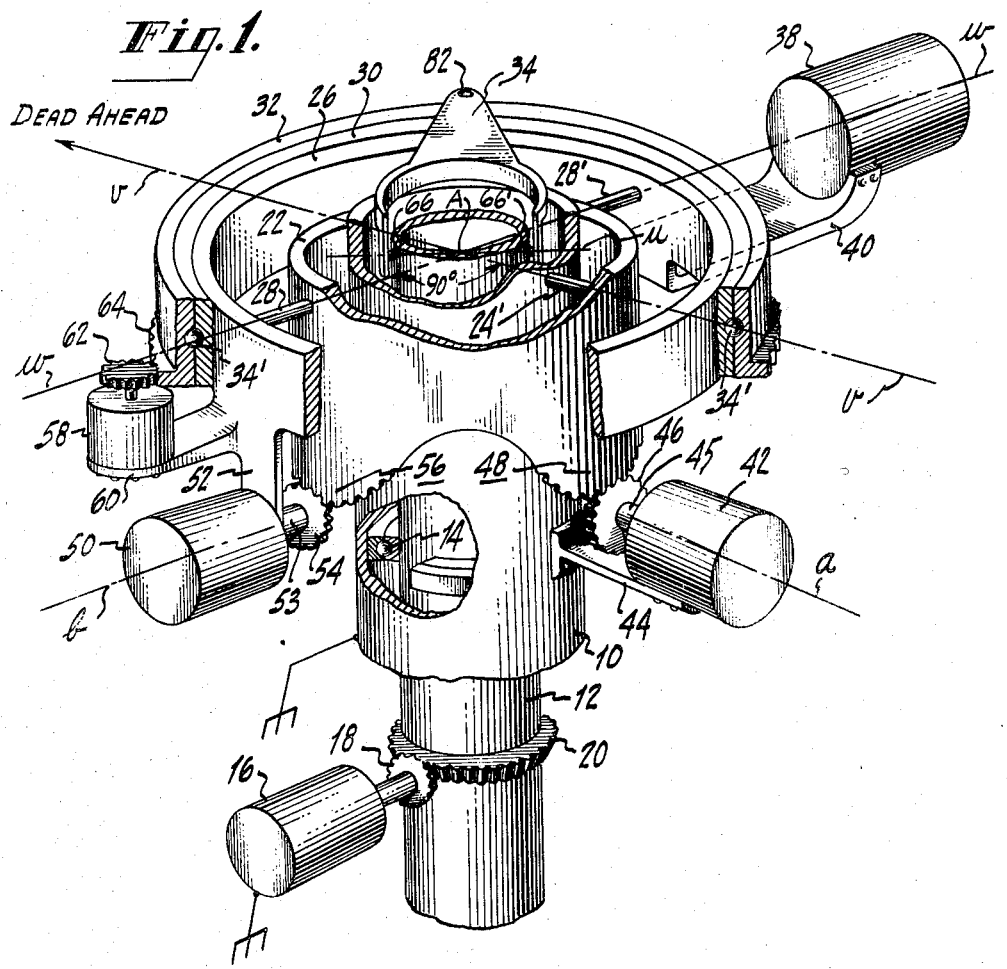
Fig. 1 is a perspective drawing of a portion of the present invention.

Referring now to the drawing and particularly to Figure 1, hollow shaft or pilaster 10 is mounted on the vehicle (not shown) such as a moving ship, aircraft, automobile or the like. Hollow shaft 12 is coaxially arranged within the pilaster and rotatably mounted with respect thereto by means of a plurality of ball bearings 14. Although only a single set of ball bearings are shown, it is to be understood there may be provided a plurality of such sets along the length of shaft 12. In a preferred form of the invention, at least one set of ball bearings 14 is mounted between the means for rotating the hollow shaft 12 including azimuth drive motor 16 and gears 18—20, and the free end of the pilaster. This is to enable the gearing, various slip rings and the rotating waveguide joint to be protected and pressurized, as will be explained more fully below.

Inner gimbal 22 is mounted for rotatable movement with respect to pilaster 10 on a pair of gimbal axles 24, 24'. Outer gimbal 26 is mounted for rotatable movement with respect to inner gimbal 22 on a second pair of gimbal axles 28, 28'. The axes $v$ and $w$ of the gimbals intersect at a common point A and are disposed at an angle of 90° with respect to one another.

Figure 4:
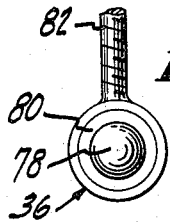
Fig. 4 is an enlarged view of a universal joint shown in Figs. 1–3.
Figure 5:
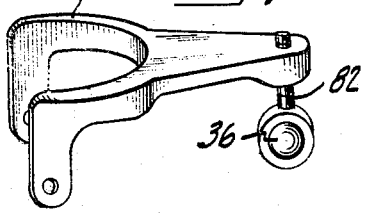
Fig. 5 is an enlarged perspective view of the clevis shown in Figs. 1–3.

The stable elements include a first annular member 30 fixed to the outer gimbal and a second annular member 32 concentric with the first member and rotatable thereabout over a set of ball bearings 34. The rotational movement of inner shaft 12 is mechanically translated to the rotatable ring 32 by means of a clevis or yoke 34 which is shown in detail in Fig. 5. The clevis is coupled to the rotatable ring 32 by means of a universal coupling 36 to permit pitch and roll of the rotatable shaft 12 with respect to the rotatable ring. The coupling is shown in more detail in Figs. 3, 4 and 5.

A gyroscope such as a "stable vertical" gyroscope 38 is secured to the outer gimbal ring 26 by means of mechanical support 40. Its function is to produce a direct current error signal when the outer gimbal pitches or rolls having a polarity dependent on the sense of the pitch and roll. Stable vertical gyroscopes are well-known in the art, as are the circuits for producing and amplifying the pitch and roll error signals and these, therefore, will not be discussed in detail.

Roll motor 42, the center axis $a$ of which is parallel to and directly below axis $v$ of the inner gimbal, is mounted in pilaster 10 by mechanical support 14. Its shaft drives pinion 46 which is engaged with gear rack 48 of inner gimbal 22. Gear rack 48 is centered with respect to the inner gimbal axis $v$.

Pitch motor 50 is secured to outer gimbal ring 26 by mechanical support 52. Shaft 53 of the pitch motor drives pinion 54, which is engaged with gear rack 56 of the inner gimbal. Both the pitch motor center axis $b$ and gear rack 56 are aligned with the axis $w$ of outer gimbal 22. The function of pitch motor 50 is to rotatably move the outer gimbal about axles 28, 38' with respect to the inner gimbal.

Selsyn transformer 58 is mounted on the outer gimbal by support 60. The transformer is driven by means of a pinion 62, which is engaged with annular gear 64, secured to the rotatable ring 32. The function of the Selsyn transformer is to provide an indication of the rotation of outer ring 32. Its output may be applied to an external device (not shown) such as a meter, counter or the like.

In operation, outer ring 32 provides a rotatable stable platform which is driven by inner, hollow shaft 12. Any departure in pitch or roll of the outer rotatable ring is sensed by gyroscope 38 which produces roll and/or pitch error signals respectively. These are supplied to the roll or pitch motors respectively. The roll motor rotates inner gimbal about axles 24, 24' with respect to pilaster 10 and the pitch motor rotates outer gimbal and the rotating platform about axles 28, 28' with respect to the inner gimbal. The overall result is that annular member 32 is maintained in its predetermined stable attitude.

It should be noted that the axes $v$ and $w$ of the inner and outer gimbals intersect at a common point A. This point is also common to the center axis $u$ of clevis supports 66, 66'. This reduces to a minimum any error in the position of the stable ring.

Figure 2:
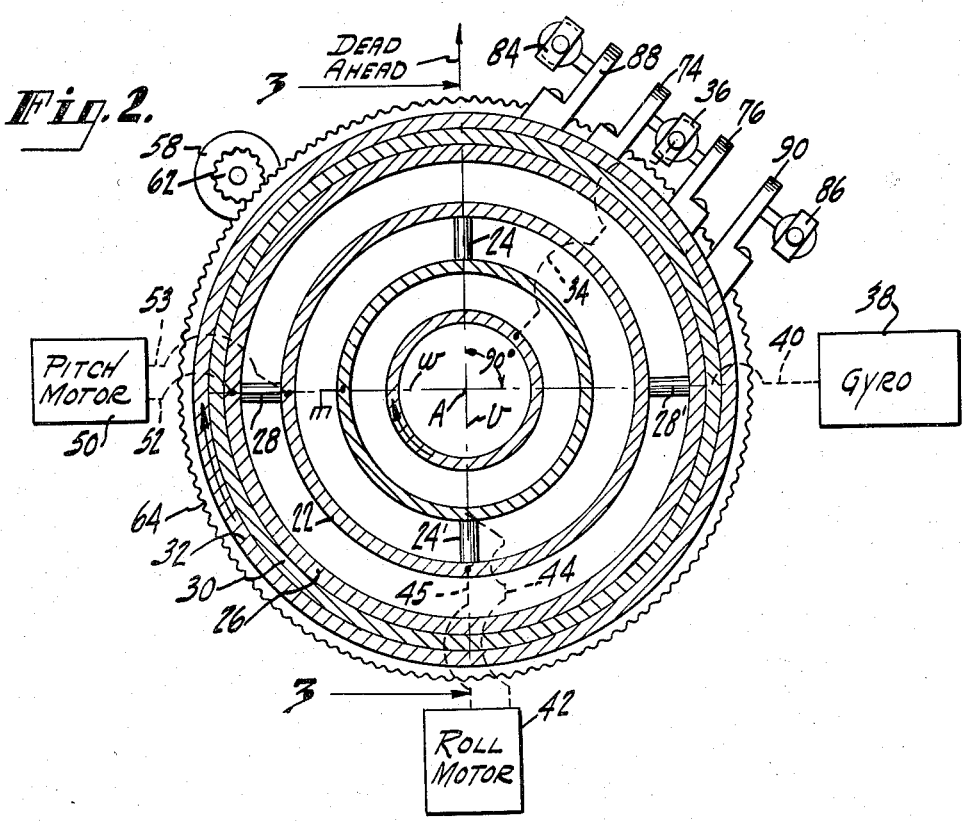
Fig. 2 is a horizontal cross-section through the arrangement shown in Fig. 1.

Fig. 2 shows the relative positions of the various axes, motors, and gyroscope. The axis $v$ of inner gimbal 22 passes through the center A of the system and is in line with the "dead ahead" direction of the moving body. The axis $w$ of the gyroscope 38 and outer gimbal intersects the $v$ axis at point A, at an angle of 90°. Selsyn transformer 58 may be positioned anywhere.

In Fig. 2 and in other of the figures the various mechanical supports and driving shafts of Fig. 1 are indicated by dashed lines. Universal bearing 36 of clevis 34 is supported by a pair of L-shaped supporting members 74, 76 which are secured as, for example, by screws to the outer rotatable annular member 32. As can be seen from Figs. 4 and 5, universal coupling 36 includes an inner ball bearing 78, an annular member 80 and a threaded shaft 82 connected to the annular member at one end thereof and threaded into the clevis 34 at the other end thereof.

Also mounted to the outer annular member 32 are two other universal joints 84, 86 on respective L-shaped supports 88, 90. These last universal couplings serve as connection points for a pair of rods which are secured at the other ends thereof to an object it is desired to rotate such as a rotatable antenna. The details of the rods and antenna will be described below.

Figure 3:
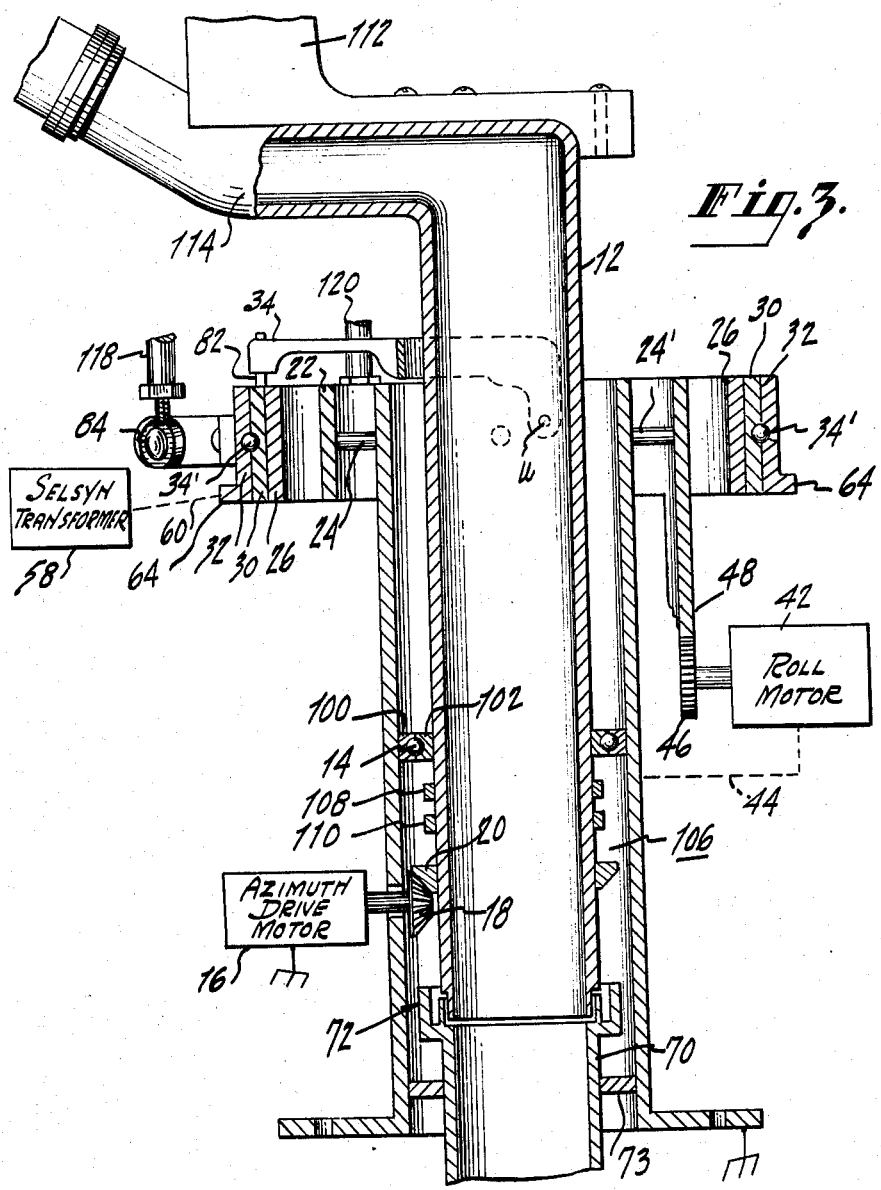
Fig. 3 is a vertical cross-sectional through the arrangement shown in Fig. 1 including a portion of the antenna supporting means and waveguide.

Fig. 3 shows further details of the system including portions of the support for a rotatable antenna. Pilaster 10 preferably is mounted perpendicular to a surface of the moving body such as the ship or aircraft carrying the antenna. The center, driven hollow shaft 12, forms a circular waveguide. It is coupled to a fixed circular waveguide 70 by means of a rotary wavetrap joint 72. The fixed waveguide 70 is supported in pilaster 10 by means of an annular supporting ring 73. Hollow shaft 12 is supported for rotatable movement with respect to the pilaster by a pair of rings 100, 102 and ball bearings 14 located between the rings. The azimuth drive motor is mounted to the moving body such as the ship or aircraft and drives the rotatable waveguide 12.

Rings 108 and 110 are slip rings and serve as electrical connections to various of the motors or other electrical components located on the rotatable parts. For example, the rings may connect with rotary transformer 162 and drive motor 150 (Fig. 9). The slip rings, per se, are well known in the art; they are merely shown diagrammatically.

With the arrangement above described, it is possible to substantially close off the space 106 and thereby prevent dirt and moisture from contaminating the components in the space. Moreover, as will be apparent to those skilled in the art, it is possible to make the ring 73 airtight and the ball bearing rings 100, 102 airtight so that, if desired, space 106 may be pressurized.

Mounted to the top end of the rotatable shaft 12 is antenna support 112. This support will be discussed in more detail below in connection with Fig. 6. The hollow waveguide 12 leads into a rectangular waveguide 114', which in turn leads to the antenna as will be shown later.

Fig. 6 is a perspective view of a parabolic rotatable antenna mounted to the antenna support assembly when the supporting body of the support assembly is at an angle with respect to the horizontal. Under conditions of pitch and roll it will be noted that stable annular member 32 remains parallel to the horizontal plane. Rotatable driving shaft 12 which is, in effect, fixed to the moving body is at an angle of pitch and roll from the vertical which is equal to the angle of pitch and roll of the moving body. Antenna supporting shaft 112 is fixed to the rotatable shaft 12 and rotates therewith, and when the rotatable shaft is inclined in pitch or roll antenna supporting shaft 112 is also inclined the same amount.

Antenna supporting shaft 112 is fixed to rotatable antenna 114 by means of universal coupling 116. Rods 118 and 120 (only rod 118 is shown in Fig. 6) are secured at one end to universal couplings 84 and 86 respectively (only coupling 84 is shown in Fig. 6) and the other end to universal couplings 122 and 124, respectively (only coupling 122 is shown in Fig. 6) on U-shaped supporting member 126. Rods 118 and 120 are parallel and of the same length. The distance between the center of coupling 116 and A is equal to the distance between the centers of couplings 122 and 84, and 124 and 86, respectively. The center of coupling 116 is aligned with the center axis 130 of shaft 12.

Figs. 7 and 8 show in greater detail the connections between rods 118 and 120, the stable annular ring 32 and antenna reflector 114. Fig. 8, for example, is a top view of the U-shaped support 126 and shows the universal couplings 124 and 126 mounted to the base of the U and the universal coupling 116 mounted to a shaft 128 which is parallel to the base of the U. Couplings 124 and 126 are supported by L-shaped supports 130 and 132.

Referring now to Figs. 2, 7 and 8, the triangle formed by the centers of universal couplings 84 and 86, and center point A (Fig. 2) is congruent to the triangle formed by the centers of universal couplings 116, 126 and 124 (Figs. 7 and 8).

In operation, as the moving body pitches and rolls, annular, rotatable, stable member 32, which may be considered to be a stable platform, remains in a horizontal position. However, the rotatable antenna driving and supporting means 12, 112 tilt and roll along with the moving body. This causes relative movement of the center point of universal coupling 116. Universal couplings 84 and 86 at the bases of rods 118 and 120 respectively remain in a stable plane, however, due to movement of universal coupling 116, couplings 122 and 124 at the other end of rods 118 and 120 also change their relative position in space. Since the distances 124, 86; 122, 84; and 116, A are equal and triangle 116, 122, 124 is congruent to triangle 36, 86, 84, antenna reflector 114 must remain in a stable attitude regardless of angle of pitch or roll.

This is clearly illustrated in Fig. 10 where it can be seen that universal couplings 122, 124, 116, 84, and 186 and point A together define a triangular cylinder. It will be remembered that the long edges of the cylinder are of the same length and that the base and apex of the cylinder form congruent triangles. Each long side of the cylinder is a parallelogram. One short edge of each parallelogram, defined by triangle 84, 186, A, remains in a horizontal plane regardless of the angle of pitch $\theta$ or the angle of roll $\phi$ of the moving body on which the antenna is mounted. In the figure, if the $x$ direction is considered the dead ahead direction, the angle of pitch $\theta$ lies in the $xy$ plane and the angle of roll $\phi$ in the $yz$ plane. The angle of pitch and roll made by the triangular cylinder (the tilt angle $\psi$) is equal to the angle of pitch and roll made by the moving body. However, since the base 84, 186, A of the triangular cylinder remains in a horizontal plane regardless of the magnitudes, within limits, of $\theta$ and $\phi$, the apex 142, 124, 116 of the cylinder also must remain in a horizontal plane and, therefore, antenna reflector 114 (Fig. 6) must remain in its stable attitude.

Referring again to Fig. 6, the hollow waveguide 12 is connected to rectangular waveguide 114'. In order to permit pitch and roll movement of the antenna support 112 there is provided a flexible rectangular waveguide component 140 between fixed waveguide 114' and fixed antenna lead-in waveguide 142. The lead-in waveguide is terminated by a feed element 144 which delivers radio frequency energy to parabolic reflector 114 and receives radio frequency energy therefrom in a manner well known in the art.

In certain embodiments of the invention it is desirable to be able to tilt the antenna in elevation during the rotational scanning thereof. An arrangement for accomplishing this is shown in Fig. 9 and includes a nod angle drive motor 150 having a pinion 152 which engages gear sector 154. The latter is fixedly mounted to antenna reflector 114 by means of an L-shaped support 156. The drive motor 150 is mounted on U-shaped bracket 158. At its free ends the U-shaped bracket is rotatably mounted on shaft 128. Shaft 128 is fixed at both ends thereof to respective L-shaped supports 156 and 160. The angle of antenna nod is measured by rotary transformer 162 which is mechanically supported to the U-shaped support 158 by mechanical support 164. This information may be supplied to an external indicator such as a meter or the like (not shown).

In operation, if it is desired to cause the antenna to change its angle of elevation, a direct current signal having polarity dependent on whether it is desired to increase or decrease the elevation angle is supplied to the drive motor 150 until the external meter indicates the desired angle of elevation. This system may be used for fixing the elevation angle at different points during rotary scanning or, if desired, continuously changing the elevation angle during rotary scanning motion to obtain three dimensional data.

Figure 11:
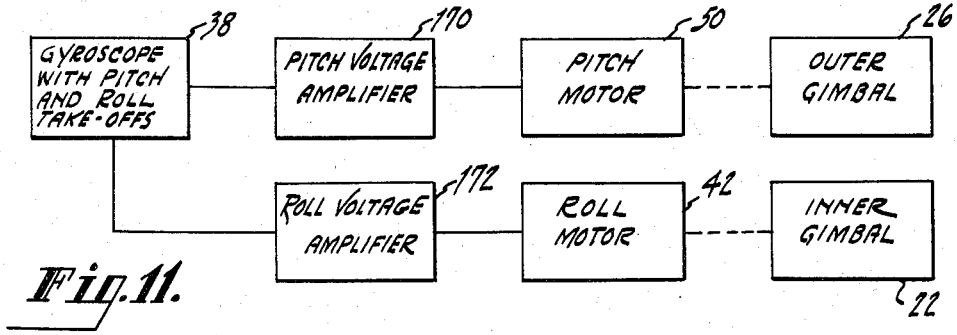
Fig. 11 is a block diagram of the electrical error signal circuit of one form of the invention.

Fig. 11 illustrates in block form one type of electrical system which may be employed in the present invention. The gyroscope 38 in its normal position provides no output signal. When the gyroscope is moved in pitch, a pitch voltage is developed and when it is moved in roll, a roll voltage is developed. The respective pitch and roll voltages are amplified to the desired power level by pitch voltage amplifier 170 and roll voltage amplifier 172, respectively, and then supplied to the pitch and roll motors 50 and 42, respectively. The latter two motors move the outer and inner gimbals 26 and 22, respectively, in the manner already described.

In the embodiment of the invention described in detail above, the gyroscope is fixedly mounted to the outer gimbal ring. The invention is equally applicable to a system in which the gyroscope is fixed to the moving body, that is, fixed to a surface of the moving ship, aircraft or land vehicle. The block diagram of the electrical system for this embodiment of the invention is shown in Fig. 12.

Figure 12:
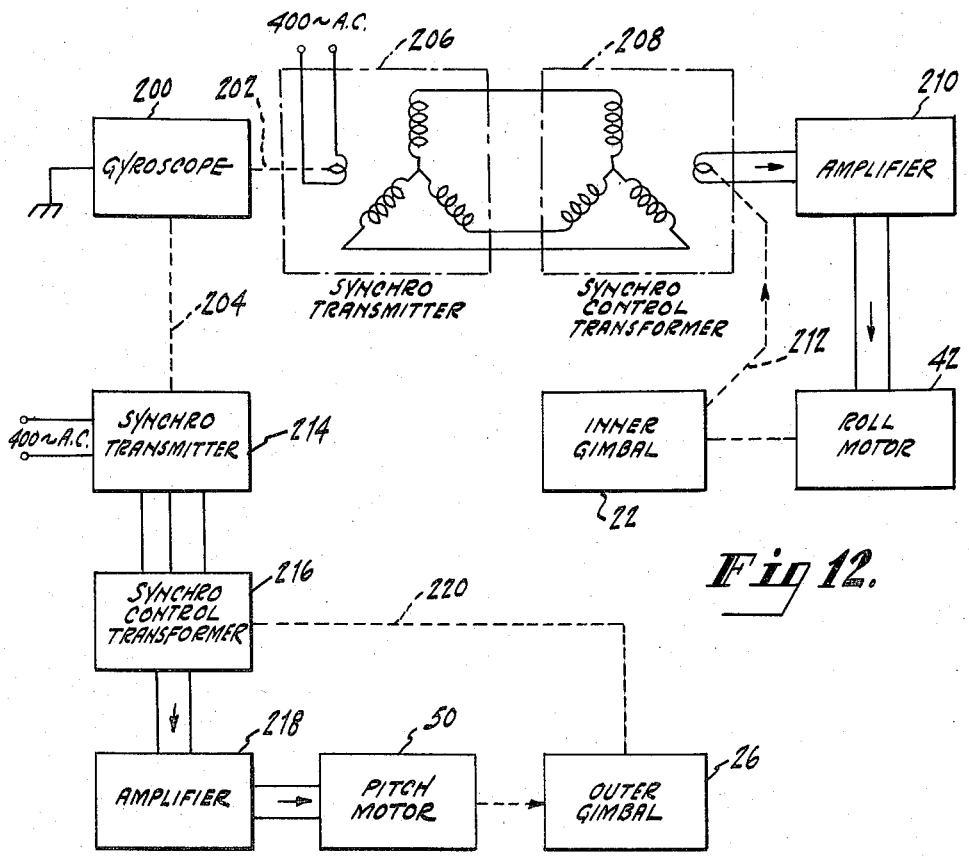
Fig. 12 is a block diagram of the electrical error signal circuit of another form of the invention.

Referring now to Fig. 12, gyroscope 200 has a first output shaft 202 providing information as to the roll of the moving body and a second output shaft 204 providing information as to the pitch of the moving body. Shaft 202 is mechanically coupled to the rotor of a synchro transmitter 206. The rotor is also supplied with an alternating current such as 400 cycles in the case of an airborne system, as shown, or any other convenient alternating current frequency. The stator of the synchro transmitter is connected to the stator of synchro control transformer 208. Amplifier 210 amplifies the output voltage, if any, of the control transformer to a power level sufficient to drive roll motor 42. As already described in detail, the roll motor drives the inner gimbal 22 via shaft 45, pinion 46 and gear rack 48, as shown in Figure 1. Shaft 45 or the inner gimbal 22 may be mechanically coupled to the rotor of the control transformer 208 by means of a shaft 212 for driving said rotor to a position such that there is zero output of the control transformer. This circuit is the well-known "null-seeking" servo system and functions to correct any departures in roll of the inner gimbal from its stable position.

In a manner similar to the above, pitch output shaft 204 drives the rotor of synchro transmitter 214 and the stator of the synchro transmitter is connected to the stator of the synchro control transformer 216. Amplifier 218 amplifies the output signal, if any, of synchro transformer 216 to a power level sufficient to drive pitch motor 50. The pitch motor drives the outer gimbal 26 via shaft 56, and gearing 54, 56 (shown in Fig. 1). The outer gimbal is mechanically connected by a shaft 220 to the rotor of the control transformer and moves it in the proper direction to obtain zero output from the transformer when the outer gimbal is in its stable position.

The above-described system has several very important advantages over prior art arrangements. One is that no correction is required to derive a direct reading of the true azimuth angle between a reflecting object and the rotating antenna. In other words, the azimuth reading provided by rotary transformer 58 is always true with respect to the heading of the moving body such as the ship or aircraft on which the antenna is mounted. This is because the azimuth angle is taken with respect to a horizontal platform or ring at all times regardless of the roll or pitch of the body on which the antenna is mounted. Thus, the projection of the azimuth angle with respect to the horizontal plane always provides a true azimuth reading whereas in prior art systems the projection of the azimuth angle is with respect to a plane other than a horizontal plane and therefore inaccurate. In these prior art systems corrections must be introduced to provide true bearing information and this requires additional complex equipment.

Another important advantage of the present arrangement is that all scanning switches, slip rings, brushes, "dead ahead" switches, etc. can be hermetically sealed to prevent dirt and moisture from affecting the system operation and, if desired, pressurized to prevent the adverse effects of low atmospheric pressures.

Another important advantage of the system is that only two drive motors are required and only one gyroscope is required. Many prior art system designed for the same purpose as the present invention require at least two gyroscopes and three, four, or even more drive motors.

What is claimed is:

1. In an arrangement including a moving body subject to pitch and roll, a hollow support mounted to said moving body, an inner gimbal mounted for rotatable movement about a first axis with respect to said support, and an outer gimbal mounted for rotatable movement about a second axis normal to said first axis, means for maintaining said outer gimbal in a predetermined plane with respect to the horizontal plane comprising, in combination, a vertical gyroscope mounted to said outer gimbal for deriving a pitch error signal in response to departures in pitch of said outer gimbal from said predetermined plane and a roll error signal in response to departures in roll of said outer gimbal from its predetermined plane, the polarity of said signals being dependent upon the sense of said departures; electromechanical means for maintaining said inner and outer gimbals in their given positions in the absence of error signals and responsive to said error signals for rotating said inner and outer gimbals about their respective axes in the correct sense to maintain said outer gimbal in said predetermined plane; an annular member concentrically arranged with respect to said outer gimbal and mounted for rotational movement about said outer gimbal in the plane of said outer gimbal; and driving means for rotating said annular member, said driving means comprising a rotatable shaft concentrically arranged within said hollow support, and mechanical means interconnecting said shaft and said annular member, whereby rotational movement of said shaft is imparted to said annular member.

2. In an arrangement as set forth in claim 1, said electromechanical means including a pitch error motor aligned with one of said axes and responsive to said pitch error signals for moving one of said gimbals about its axis with respect to said support and a roll error motor aligned with the other of said axes and responsive to said roll error signal for moving the other of said gimbals about said other of said axes.

3. In an arrangement as set forth in claim 1, said inner gimbal being formed with a first gear rack symmetrically arranged with respect to said first axis, and a second gear rack symmetrically arranged with respect to said second axis, said electromechanical means including a roll error motor mounted on said support and aligned with the first of said axes, and a pinion driven by said roll motor engaging said first gear rack, said roll error motor being responsive to said roll error signal for rotating said inner gimbal about said first axis with respect to said support, and a pitch error motor aligned with the second of said axes and mounted on said outer gimbal, and a pinion in mesh with said second gear rack and driven by said pitch error motor for rotating said outer gimbal about said second axis with respect to said inner gimbal, said pitch error motor being responsive to said pitch error signal.

4. In an arrangement as set forth in claim 1, a plurality of ball bearings located between the circumferential surface of said outer gimbal and the inner surface of said annular member for permitting said rotational movement of said annular member.

5. An arrangement for maintaining an element in or parallel to a predetermined plane while rotating the same about a center axis comprising, in combination, a hollow supporting shaft concentric with said axis; an inner gimbal mounted for rotatable movement about a second axis normal to said center axis with respect to said supporting shaft; an outer gimbal mounted for rotatable movement about a third axis perpendicular to said second axis, said inner and outer gimbals and their axes lying in a plane perpendicular to said first axis in at least one position, said element being movably mounted on said outer gimbal for movement about the circumferential surface thereof in or parallel to said predetermined plane; a rotatable driving member concentric with said center axis located within said hollow shaft and mounted for rotatable movement with respect thereto about said center axis; mechanical means interconnecting said driving member and said element, whereby rotation of said driving member causes rotation of said element; a stable vertical gyroscope mounted to said outer gimbal for deriving a pitch error signal in response to departures of pitch of said element from said predetermined plane and a roll error signal in response to departures of roll in said element from its predetermined plane, the polarity of said signals being dependent upon the sense of said departures; and means responsive to said error signals for rotating said inner and outer gimbals about their respective axes in the correct sense to maintain said rotatable element in or parallel to said predetermined plane.

6. An arrangement for maintaining an object, mounted to a body subject to disturbing angular movements, in a stable attitude while rotating the same comprising, in combination, a support fixedly mounted on said body; an inner gimbal mounted for rotatable movement about a first axis with respect to said support; an outer gimbal mounted for rotatable movement about a second axis normal to said first axis; circuit means for deriving a pitch error signal in response to departures in pitch of a surface of said body from a reference plane and a roll error signal in response to departures in roll of said surface of said body from said reference plane, the polarity of said signals being dependent upon the sense of said departures; electromechanical means connected to receive said error signals and mechanically coupled to said inner and outer gimbals for maintaining said gimbals in a given position when there is no error signal and for rotating said inner and outer gimbals about their respective axes in the correct sense to maintain said outer gimbal in a predetermined attitude in response to said error signals; a member mounted for rotatable movement about the outer circumferential surface of said outer gimbal; driving means including a driving shaft perpendicular to said first axis and extending into said inner gimbal, said driving means being mounted to said support; mechanical means interconnecting the portion of said shaft extending into said inner gimbal and said member mounted for rotatable movement about said outer gimbal for rotating the latter about said outer gimbal, and said object being mounted to said rotatable member.

7. An arrangement as set forth in claim 6, wherein said circuit means includes a gyroscope having pitch and roll error signal take-offs fixedly mounted to said outer gimbal.

8. An arrangement as set forth in claim 6, wherein said circuit means includes a gyroscope having pitch and roll error signal take-offs fixedly mounted to said body, a first null-seeking servo system connected to receive the pitch error signal output thereof for driving one of said gimbals, and a second null-seeking servo system connected to receive the roll error signal output thereof for driving the other of said gimbals.

9. In an arrangement for maintaining an object, mounted to a body subject to pitch and roll, in a stable attitude while rotating the body, in combination, a tubular supporting shaft fixedly mounted on said body, said shaft having a longitudinal axis; an inner gimbal rotatably mounted on said supporting shaft for movement about a first axis normal to said longitudinal axis; an outer gimbal rotatably mounted on said inner gimbal for rotatable movement about a second axis normal to and intersecting said first axis at the intersection point of said first axis and said longitudinal axis; circuit means for deriving a pitch error signal in response to departures in pitch of a surface of said body from a reference plane and a roll error signal in response to departures in roll of said surface of said body from said reference plane, the polarity of said signals being dependent upon the sense of said departures; electromechanical means connected to receive said error signals and mechanically coupled to said inner and outer gimbals for maintaining said gimbals in a given position when there is no error signal and responsive to an error signal for rotating said inner and outer gimbals about their respective axes in the correct sense to maintain said outer gimbal in a predetermined attitude; an annular member coaxially arranged about and mounted to said outer gimbal for rotatable movement about the outer circumferential surface thereof; a rotatable shaft located within said tubular supporting shaft and coaxial therewith; driving means fixedly mounted on said tubular supporting shaft and engaging said rotatable shaft for rotating the latter about said longitudinal axis; and an interconnecting shaft connected at one end thereof to said rotatable shaft at the common intersection point of said gimbals and longitudinal axis, and connected at the other end thereof to said annular member for imparting the rotatable movement of said rotatable shaft to said annular member.

10. In an arrangement for maintaining an object, mounted to a body subject to disturbing angular movements, in a stable attitude while rotating the object, in combination, a stable plane system mounted to said body including an annular member maintained in a stable attitude regardless of said disturbing angular movements of said body, said annular member being rotatable about its center axis; a rotatable driving shaft mounted to said body and movable with said body, said shaft being aligned with said center axis in one position of said body; a yoke connected at one end to said driving shaft and at the other end to said annular member, whereby rotation of said driving shaft about said center axis causes rotation of said annular member; a mounting element fixedly mounted to said driving shaft at one end thereof and universally connected to said object at the other end thereof; a pair of universal connection points fixedly mounted to said annular member, one located on one side of said other end of said yoke and the other located on the other side of said other end of said yoke, said pair of universal connection points and said one end of said yoke together forming a first triangle; a pair of universal connection points fixedly mounted to said object, said last-named connection points and said other end of said mounting element forming together a second triangle which is congruent to said first triangle; and a pair of shaft means joining said pair of universal connection points on said annular member with said pair of universal connection points on said object, each of said shaft means being equal in length to the distance between said one end of said yoke and said other end of said mounting element.

11. In an arrangement including a support, an inner gimbal mounted to said support for rotational movement about a first axis passing through said support, and an outer gimbal mounted to said support for rotational movement about a second axis passing through said support and normal to said first axis, said outer gimbal being concentrically arranged with respect to said inner gimbal in one position of said gimbals; means mounted to said outer gimbal for deriving a pitch error signal in response to departures in pitch of said outer gimbal from a predetermined position thereof and a roll error signal in response to departures in roll of said outer gimbal from said predetermined position thereof, the polarity of said signals depending upon the sense of said departures; electromechanical means for maintaining said inner and outer gimbals in a given positional relationship in the absence of error signals and responsive to said error signals for rotating said inner and outer gimbals about their respective axes in the correct sense to maintain said outer gimbal in its predetermined position; an annular member concentrically arranged with respect to said outer gimbal and mounted for rotational movement about said outer gimbal in the plane of said outer gimbal; a rotatable shaft mounted to said support arranged perpendicularly of both of said axes in at least one position of said gimbals and extending into the space within said inner gimbal; and mechanical means interconnecting a portion of said shaft within said space to said annular member for imparting the rotational movement of said shaft to said annular member.

12. In an arrangement for maintaining an antenna, mounted to a body subject to disturbing angular movements, in a stable attitude while rotating the antenna, in combination, a stable plane system mounted to said body including an annular member maintained in a stable attitude regardless of said disturbing angular movements of said body, said annular member being rotatable about its center axis; a rotatable driving shaft mounted to said body and movable with said body, said shaft being aligned with said center axis in one position of said body, and said shaft being formed as an electromagnetic wave transmission means for the transfer of energy to said antenna; a yoke connected at one end to said driving shaft and at the other end to said annular member, whereby rotation of said driving shaft about said center axis causes rotation of said annular member; a mounting element fixedly mounted to said driving shaft at one end thereof and universally connected to said object at the other end thereof; a pair of universal connection points fixedly mounted to said annular member, one located on one side of said other end of said yoke and the other located on the other side of said other end of said yoke, said pair of universal connection points and said one end of said yoke together forming a first triangle; a pair of universal connection points fixedly mounted to said antenna, said last-named connection points and said other end of said mounting element forming together a second triangle which is congruent to said first triangle; and a pair of shaft means joining said pair of universal connection points on said annular member with said pair of universal connection points on said antenna, each of said shaft means being equal in length to the distance between said one end of said yoke and said other end of said mounting element.

13. In an arrangement for maintaining an antenna, mounted to a body subject to disturbing angular movements, in a stable attitude while rotating the antenna, in combination, a stable plane system mounted to said body including an annular member maintained in a stable attitude regardless of said disturbing angular movements of said body, said annular member being rotatable about its center axis; a hollow, rotatable driving shaft serving as a waveguide mounted to said body and movable with said body, said shaft being aligned with said center axis in one position of said body; a yoke connected at one end to said driving shaft and at the other other to said annular member, whereby rotation of said driving shaft about said center axis causes rotation of said annular member; a mounting element fixedly mounted to said driving shaft at one end thereof and universally connected to said object at the other end thereof; a pair of universal connection points fixedly mounted to said annular member, one located on one side of said other end of said yoke and the other located on the other side of said other end of said yoke, said pair of universal connection points and said one end of said yoke together forming a first triangle; a pair of universal connection points fixedly mounted to said antenna, said last-named connection points and said other end of said mounting element forming together a second triangle which is congruent to said first triangle; a pair of shaft means joining said pair of universal connection points on said annular member with said pair of universal connection points on said object, each of said shaft means being equal in length to the distance between said one end of said yoke and said other end of said mounting element; and transmission line means operatively connecting said waveguide to said antenna.

14. In an arrangement for maintaining an antenna, mounted to a body subject to disturbing angular movements, in a stable attitude while rotating the antenna, in combination, a stable plane system mounted to said body including an annular member maintained in a stable attitude regardless of said disturbing angular movements of said body, said annular member being rotatable about its center axis; a hollow rotatable driving shaft serving as a waveguide mounted to said body and movable with said body, said shaft being aligned with said center axis in one position of said body; a yoke connected at one end to said driving shaft and at the other end to said annular member, whereby rotation of said driving shaft about said center axis causes rotation of said annular member; a mounting element fixedly mounted to said driving shaft at one end thereof and universally connected to said object at the other end thereof; a pair of universal connection points fixedly mounted to said annular member, one located on one side of said other end of said yoke and the other located on the other side of said other end of said yoke, said pair of universal connection points and said one end of said yoke together forming a first triangle; a pair of universal connection points fixedly mounted to said antenna, said last-named connection points and said other end of said mounting element forming together a second triangle which is congruent to said first triangle; a pair of shaft means joining said pair of universal connection points on said annular member with said pair of universal connection points on each object, each of said shaft means being equal in length to the distance between said one end of said yoke and said other end of said mounting element; and a length of hollow, flexible waveguide operatively connecting the hollow rotatable driving shaft which serves as a waveguide to the antenna.

15. In an arrangement for maintaining an object, mounted to a body subject to disturbing angular movements, in a stable attitude while rotating the object, in combination, a stable plane system mounted to said body including an annular member maintained in a stable attitude regardless of said disturbing angular movements of said body, said annular member being rotatable about its center axis; a rotatable driving shaft mounted to said body and movable with said body, said shaft being aligned with said center axis in one position of said body; a yoke connected at one end to said driving shaft and at the other end to said annular member, whereby rotation of said driving shaft about said center axis causes rotation of said annular member; a mounting element fixedly mounted to said driving shaft at one end thereof and universally connected to said object at the other end thereof; a pair of universal connection points fixedly mounted to said annular member, one located on one side of said other end of said yoke and the other located on the other side of said other end of said yoke, said pair of universal connection points and said one end of said yoke together forming a first triangle; a pair of universal connection points fixedly mounted to said object, said last-named connection points and said other end of said mounting element forming together a second triangle which is congruent to said first triangle; a pair of shaft means joining said pair of universal connection points on said annular member with said pair of universal connection points on said object, each of said shaft means being equal in length to the distance between said one end of said yoke and said other end of said mounting element; a mounting element mounted on at least one of said shaft means located adjacent the plane of said second triangle; and driving means fixedly mounted to said last-named mounting element for tilting said object in a plane different from the plane of rotation of said object.

16. In an arrangement for maintaining an antenna, mounted to a body subject to disturbing angular movements, in a stable attitude while rotating the antenna, in combination, a stable plane system mounted to said body including an annular member maintained in a stable attitude regardless of said disturbing angular movements of said body, said annular member being rotatable about its center axis; a rotatable driving shaft mounted to said body and movable with said body, said shaft being aligned with said center axis in one position of said body; a yoke connected at one end to said driving shaft and at the other end to said annular member, whereby rotation of said driving shaft about said center axis causes rotation of said annular member; a mounting element fixedly mounted to said driving shaft at one end thereof and universally connected to said object at the other end thereof; a pair of universal connection points fixedly mounted to said annular member, one located on one side of said other end of said yoke and the other located on the other side of said other end of said yoke, said pair of universal connection points and said one end of said yoke together forming a first triangle; a pair of universal connection points fixedly mounted to said antenna, said last-named connection points and said other end of said mounting element forming together a second triangle which is congruent to said first triangle; a pair of shaft means joining said pair of universal connection points on said annular member with said pair of universal connection points on said object, each of said shaft means being equal in length to the distance between said one end of said yoke and said other end of said mounting element; a mounting device mounted on said two shaft means adjacent the plane of said second triangle; and a tilt motor mounted on said mounting device and engaging said antenna for tilting said antenna in a plane perpendicular to the plane of rotation of said antenna during rotation of said antenna.

17. In an arrangement for maintaining an antenna, mounted to a body subject to disturbing angular movements, in a stable attitude while rotating the antenna, in combination, a stable plane system mounted to said body including an annular member maintained in a stable attitude regardless of said disturbing angular movements of said body, said annular member being rotatable about its center axis; a hollow rotatable driving shaft serving as a circular, hollow-pipe waveguide mounted to said body and movable with said body, said shaft being aligned with said cener axis in one position of said body; a yoke connected at one end to said driving shaft and at the other end to said annular member, whereby rotation of said driving shaft about said center axis causes rotation of said annular member; a mounting element fixedly mounted to said driving shaft at one end thereof and universally connected to said object at the other end thereof; a pair of universal connection points fixedly mounted to said annular member, one located on one side of said other end of said yoke and the other located on the other side of said other end of said yoke, said pair of universal connection points and said one end of said yoke together forming a first triangle; a pair of universal connection points fixedly mounted to said antenna, said last-named connection points and said other end of said mounting element forming together a second triangle which is congruent to said first triangle; a pair of shaft means joining said pair of universal connection points on said annular member with said pair of universal connection points on said object, each of said shaft means being equal in length to the distance between said one end of said yoke and said other end of said mounting element; a flexible, hollow-pipe waveguide connecting said circular waveguide to said antenna; a mounting device mounted on said two shaft means adjacent the plane of said second triangle; and a tilt motor mounted on said mounting device and engaging said antenna for tilting said antenna in a plane perpendicular to the plane of rotation of said antenna during rotation of said antenna.

18. An arrangement for maintaining an antenna, mounted to a body subject to disturbing angular movements, in a stable attitude while rotating the same comprising, in combination, a support fixedly mounted on said body; an inner gimbal mounted for rotatable movement about a first axis with respect to said support; an outer gimbal mounted for rotatable movement about a second axis normal to said first axis; circuit means for deriving a pitch error signal in response to departures in pitch of a surface of said body from a reference plane and a roll error signal in response to departures in roll of said surface of said body from said reference plane, the polarity of said signals being dependent upon the sense of said departures; electromechanical means connected to receive said error signals and mechanically coupled to said inner and outer gimbals for maintaining said gimbals in a given position when there is no error signal and for rotating said inner and outer gimbals about their respective axes in the correct sense to maintain said outer gimbal in a predetermined attitude in response to said error signals; a member mounted for rotatable movement about the outer circumferential surface of said outer gimbal; driving means including a hollow driving shaft perpendicular to said first axis and extending into said inner gimbal, said driving means being mounted to said support; and mechanical means interconnecting the portion of said shaft extending into said inner gimbal and said member mounted for rotatable movement about said outer gimbal for rotating the latter about said outer gimbal, said antenna being mounted to said rotatable member, and said hollow driving shaft serving as a waveguide for the transmission of energy to or from said antenna.

19. In an arrangement for maintaining an object, mounted to a body subject to disturbing angular movements, in a stable attitude, in combination, a stable plane system mounted to said body for maintaining a portion of said system in a stable attitude regardless of said disturbing angular movement of said body, said stable plane system including an imaginary pivot point about which said portion of said system in a stable attitude may move relative to said body; supporting shaft means mounted to said body and movable with said body, said shaft means having an axis passing through said pivot point; a member pivotally connected to an end of said shaft means; and two other shaft means mounted parallel to, and equal in length from end-to-end to a line extending from said pivotal connection to said pivot point, said other shaft means being spaced from one another and from said supporting shaft means, each said other shaft means being pivotally connected at one end to spaced portions of said stable plane system in a stable attitude and pivotally connected at the other end to spaced portions of said member.

20. In an arrangement for maintaining an object, mounted to a body subject to disturbing angular movements, in a stable attitude, in combination, a stable plane system mounted to said body for maintaining a portion of said system in a stable attitude regardless of said disturbing angular movement of said body, said stable plane system including an imaginary pivot point about which said portion of said system in a stable attitude may move relative to said body; rotatable supporting shaft means mounted to said body and movable with said body, said shaft means having an axis passing through said pivot point; a member pivotally connected to an end of said shaft means; and two other shaft means mounted parallel to, and equal in length from end-to-end to a line extending from said pivotal connection to said imaginary pivot point, said other shaft means being spaced from one another and from said rotatable supporting shaft means, each said other shaft means being pivotally connected at one end to spaced portions of the portion of said stable plane system in a stable attitude and pivotally connected at the other end to spaced portions of said member.

21. In an arrangement for maintaining an object, mounted to a body subject to disturbing angular movements, in a stable attitude, in combination, a stable plane system mounted to said body for maintaining a portion of said system in a stable attitude regardless of said disturbing angular movement of said body, said stable plane system including an imaginary pivot point about which said portion of said system in a stable attitude may move relative to said body; a hollow, rotatable supporting shaft means mounted to said body and movable with said body, the center axis of said shaft means passing through said pivot point; an antenna support pivotally connected to an end of said shaft; an antenna mounted on said antenna support; and two other shaft means mounted parallel to, and equal in length from end-to-end to a line extending from said pivotal connection to said pivot point; said other shaft means being spaced from one another and from said hollow, rotatable supporting shaft means, each said other shaft means being pivotally connected at one end to spaced portions of the portion of said stable plane system in a stable attitude, and pivotally connected at the other end to spaced portions of said antenna support, said rotatable, hollow supporting shaft means serving as a waveguide for the transmission of radio frequency energy to or from said antenna; and a flexible waveguide operatively connecting said hollow shaft means to said antenna.

References Cited in the file of this patent

UNITED STATES PATENTS 2,426,658   Wooldridge _____ Sept. 2, 1947